United States Patent [19]

Barile, Sr.

[11] 4,016,612

[45] Apr. 12, 1977

[54] BED FRAME FOR HOSPITAL-TYPE BED

[76] Inventor: Peter Barile, Sr., 10381 Gulfshore Drive, Naples, Fla. 33940

[22] Filed: Nov. 19, 1975

[21] Appl. No.: 633,449

[52] U.S. Cl. .................................. 5/200 C; 5/92; 5/317 R; 211/182; 403/175; 403/402

[51] Int. Cl.[2] .................. A47C 19/02; A47C 19/22

[58] Field of Search ............. 5/317, 200, 288, 299, 5/92; 248/188; 211/182; 403/175, 402; 52/758 H

[56] References Cited

UNITED STATES PATENTS

| 603,814 | 5/1898 | Dipman et al. | 5/200 C |
|---|---|---|---|
| 819,068 | 5/1906 | Ives | 5/317 R |
| 866,522 | 9/1907 | Scanlon | 5/317 R |
| 1,806,773 | 5/1931 | Waters | 5/317 R |
| 3,612,639 | 10/1971 | Williams | 312/330 |
| 3,765,541 | 10/1973 | Madey et al. | 52/758 H |
| 3,840,980 | 10/1974 | Auriol | 85/37 |

FOREIGN PATENTS OR APPLICATIONS

| 647,691 | 8/1962 | Canada | 403/402 |
|---|---|---|---|
| 121,846 | 6/1948 | Sweden | 312/330 |
| 1,134,559 | 11/1968 | United Kingdom | 403/402 |

Primary Examiner—Paul R. Gilliam
Assistant Examiner—Alex Grosz
Attorney, Agent, or Firm—Silverman & Cass, Ltd.

[57] ABSTRACT

A bed frame especially suitable for a hospital bed construction. The bed rails are provided by one or more extruded metal channel members connected into a familiar rectangular frame. Extruded metal corner brackets are riveted to the corners of the frame. The corner brackets have integral extensions and formations which serve a variety of functions such as for supporting safety side rails and for the bed headboard and footboard members, standards for supporting patient treating equipment, among others. The bracket serves a dual function of strengthening and/or retaining the channel members in the rectangular frame formation and providing means for attaching a variety of different devices to the bed frame.

12 Claims, 5 Drawing Figures

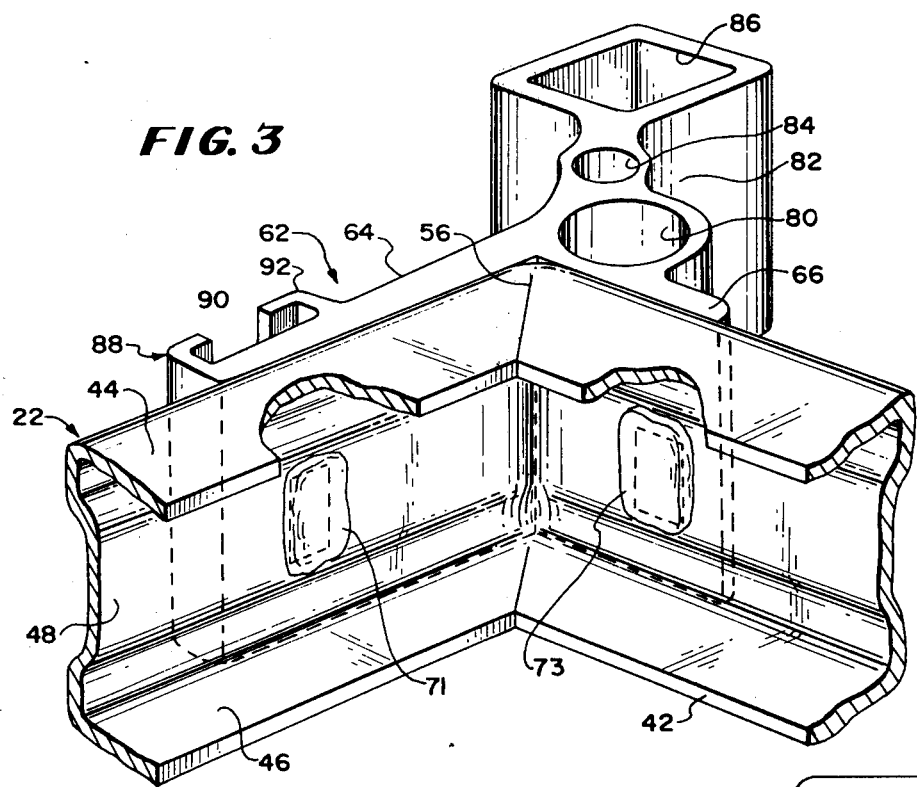
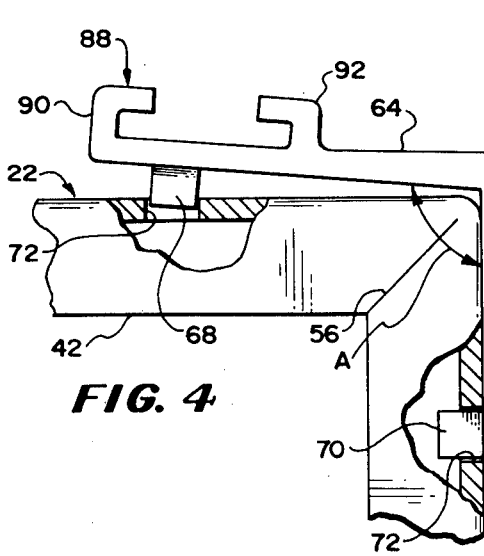
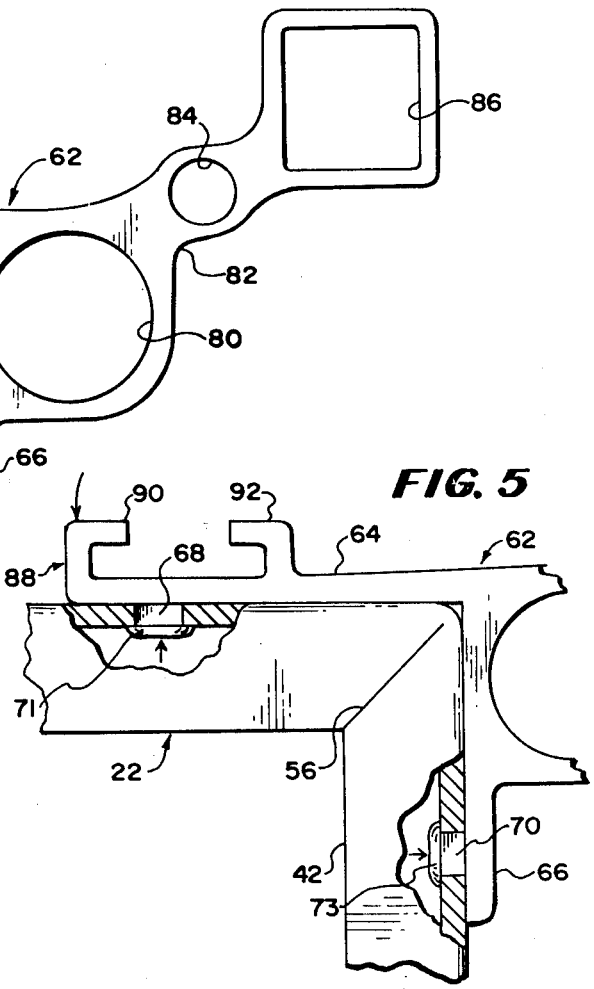

BED FRAME FOR HOSPITAL-TYPE BED

BACKGROUND OF THE INVENTION

1. Field of the Invention

This invention relates generally to bed frames and more particularly, to a novel bed frame for a hospital-type bed formed of conjoined extruded metal rail and bracket members having means for mounting a plurality of auxiliary accessories and attachments.

2. Description of the Prior Art

Hospital-type beds generally include a bed frame designed to accommodate automatic elevator apparatus for adjusting the mattress to a plurality of different positions and means for mounting attachments and accessories, such as, side rails, head and foot boards, intravenous feeding bottle standards and other accessories desirable for such a bed. Heretofore, such bed frames have been very expensive to manufacture and complex in the manner necessitated for mounting such attachments and accessories.

Examples of prior art bed frames for hospital-type beds and means for mounting such accessories and attachments are represented in U.S. Pat. Nos. 1,797,847; 2,642,250; 2,703,265; 2,913,740; 3,486,176; 3,565,380; 3,220,023; 3,312,986.

Examples of prior art bed frames illustrating known means for joining the bedrail members together are represented in U.S. Pat. Nos. 793,903 and 3,822,423. It is believed that the bed rail member joints illustrated by these patents militate against their fabrication by metal extrusion methods.

The invention succeeds in providing a novel combination of bedrail member and bracket for joining together free ends of the member into an open rectangular bed frame for a hospital-type bed. Said bedrail member and bracket are formed from lengths of extruded metal and severed from lengths of such extruded metal so that mass-production techniques can be employed readily with attendant economic advantages. Further, the bracket has means for mounting attachments and accessories on the erected bed frame.

SUMMARY OF THE INVENTION

The bed frame is assembled from one, two or four individual bedrail members having free ends into an open rectangular frame formation. Each rail member is an extruded metal member of identical cross-sectional configuration. Thus, the members can be cut to length from a longer, continuous extruded length of metal and bent as needed. A bracket member is provided for joining together adjacent free ends of the rail members at the four corners of the bed frame. Each bracket member used is identical in cross-sectional configuration and also, preferably is an extruded metal member cut from a longer, continuous extruded length of metal.

The cross-sectional configuration of the rail members and brackets are complementary so that the two can be matingly engaged face-to-face for forming the conjoined corners of the bed frame.

Each rail member is selectively slotted for receiving cooperating rivet formations integral with a bracket member to which it is attached at a corner of the bed frame. The rivet formations are peened over or swagged in any suitable manner.

Each bracket has a plurality of bores therethrough and/or sockets for receiving an upright standard or post which is part of an accessory or attachment desired to be mounted on the bed frame for advantageous usage of the bed proper. Such accessory or attachment may be mounted on the bed frame permanently or temporarily, as desired.

BRIEF DESCRIPTION OF THE DRAWINGS

FIG. 3 is a fragmentary perspective view of one corner of the bed frame with a bracket member secured thereon, parts thereof being broken away to show details;

FIG. 4 is a fragmentary top plan view with portions broken away, showing one stage in assembly of a bracket member to bed rail members at a corner of the bed frame;

FIG. 5 is a fragmentary plan view similar to FIG. 4 showing the bracket member completely assembled on the frame.

DESCRIPTION OF THE PREFERRED EMBODIMENT

Figure 1:
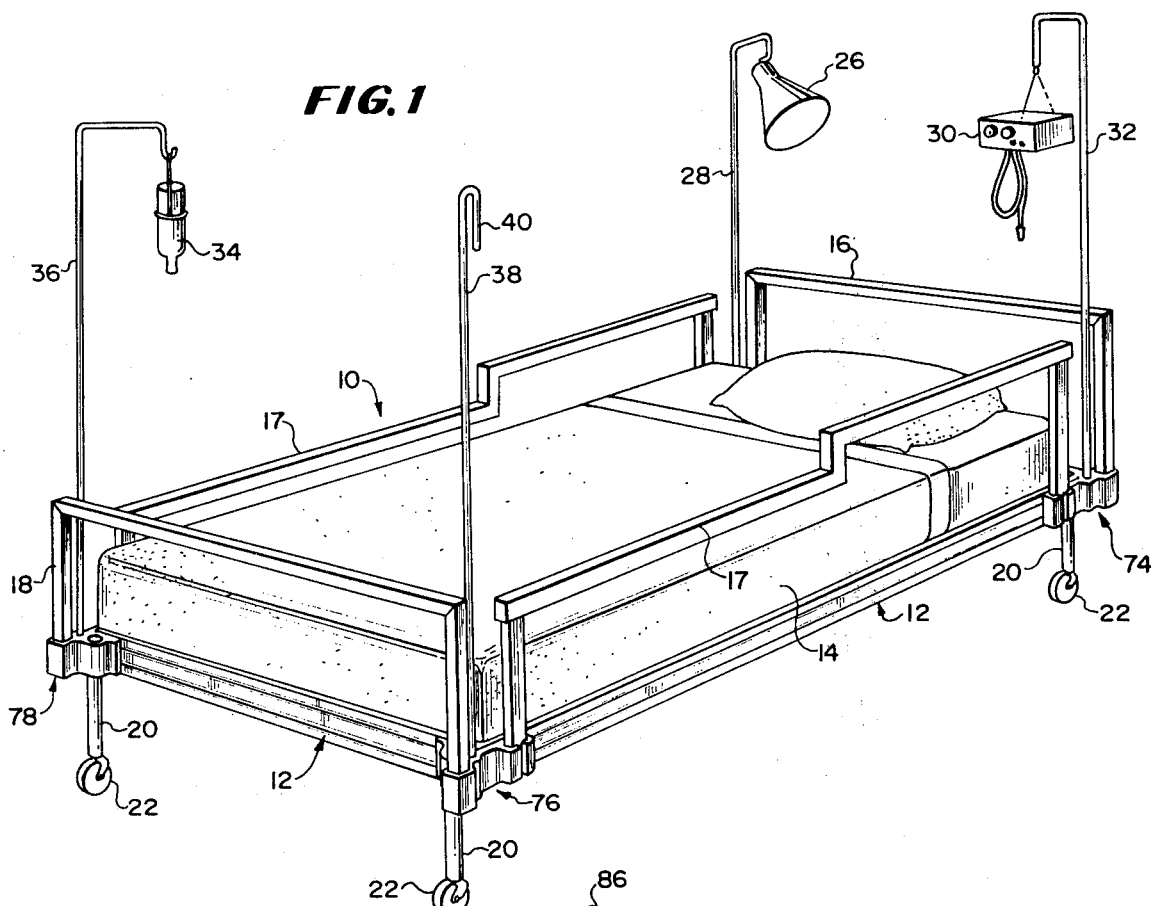
FIG. 1 is a perspective view of a bed utilizing the bed frame embodying the invention and showing examples of attachments and accessories which can be mounted on said bed frame.

A hospital-type bed designated generally by reference character 10 and formed from the bed frame 12 embodying the invention with illustrative attachments and accessories is shown in FIG. 1. There is a mattress 14, a headboard 16, side guard rails 17 and footboard 18 upon the bed frame 12 in a customary location. Power means for adjusting mattress positions is not shown. Legs 20 with wheels 22 are engaged upon the frame 12, and four hospital-type appliances are supported thereon, there being a lamp 26 with its standard 28, a traction or the like device 30 with its standard 32, a plasma bottle 34 with its standard 36 and a further standard 38 with a hook 40 for supporting an additional unillustrated appliance. The particular configuration of the four standards and the specific associated appliances shown in FIG. 1 are for purposes of illustration only and it is to be understood that other ones of a wide variety of such appliances and standard configurations may be mounted to the bed frame 12.

Figure 2:
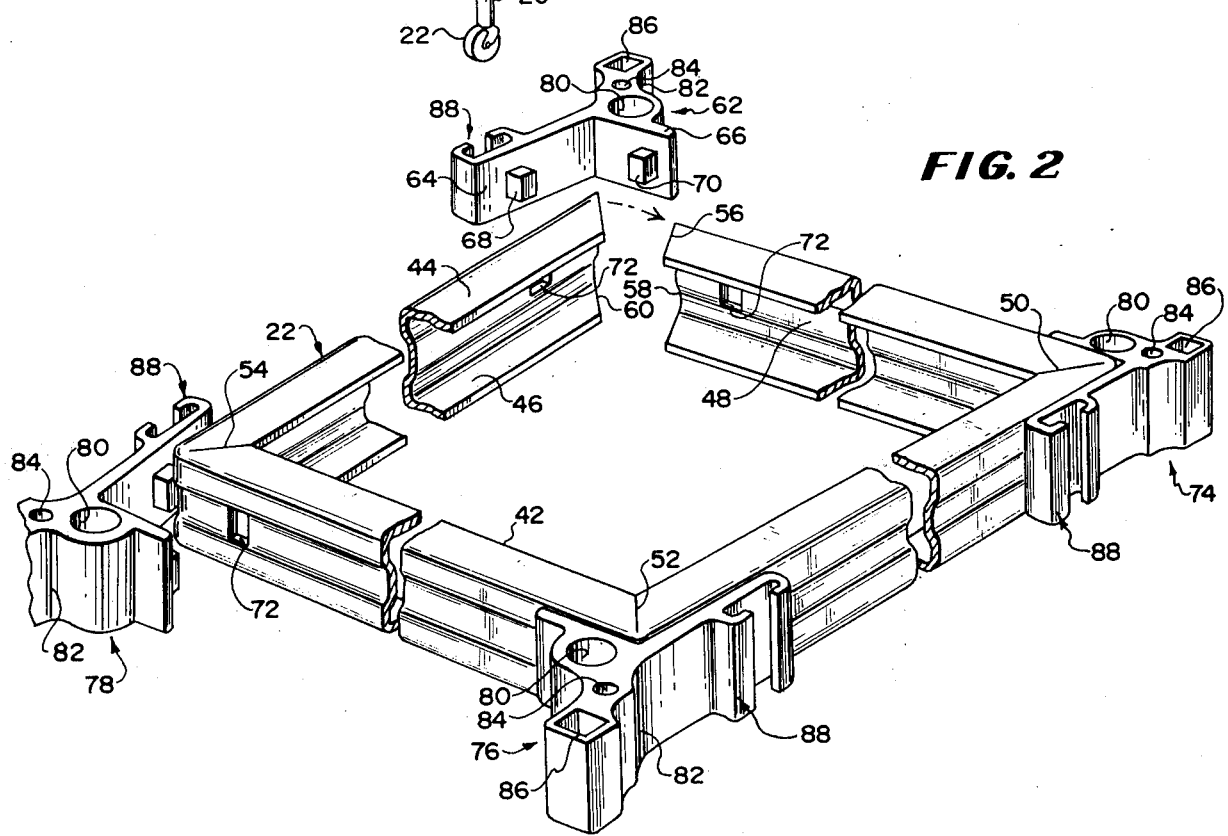
FIG. 2 is a perspective exploded view, partially sectioned, of the bed rail and bracket members of the invention.

The bed frame 12 is shown most clearly in FIGS. 2 and 3. Said frame is comprised of a generally channel-shaped rail 42 having oppositely facing leg portions 44, 46 with a web 48 therebetween. The rail 42 preferably is formed of aluminum or aluminum alloy by extrusion process so as to provide a continuous length which is then selectively cut into the rail 42 by folding the same over at three locations to form the corners 50, 52, 54 of the frame 12 as shown, including the necessary slicing of parts to permit forming the necessary joint. The fourth corner 56 of the frame may include weldment (not shown) between ends 58, 60 to further securely join these ends together.

In addition to, or in lieu of the weldment applied between ends 58, 60, a bracket 62 may be secured to the frame 12 about corner 56. Bracket 62 is of generally L-shaped cross-sectional configuration and may be produced from a continuous length extruded elongate member which is then cut transversely to provide a plurality of like brackets, as illustrated, of identical configurations.

The bracket 62 includes a first leg 64 and a second leg 66 angularly displaced relative to the leg 64. The original angle A provided between legs 64, 66 is slightly greater than 90°, as shown in FIG. 4, to facilitate assembly of the bracket on the frame 12 as described below. Each leg 64, 66 is provided with rivets 68, 70 projecting from the inner facing surface of the respective leg. In the drawing, the rivets 68, 70 are shown as being of rectangular-shaped configuration, but any other shape, such as circular, would be suitable. The frame 12 is provided proximate each corner 50, 52, 54 and 56 thereof with a pair of rivet receiving openings 72. The openings 72 are positioned such that the bracket 62 may be located upon a corner with one rivet 70 disposed in an opening 72, and the other rivet 68 partially disposed in another opening 72. This latter condition is shown in FIG. 4.

The bracket 62 is assembled upon frame 12 by bending leg 64 forward to close the angle A such that rivet 68 is totally disposed in its opening 72 (FIG. 5). Thereafter the rivets 68, 70 are flattened to form heads 71, 73 so as to securely join the bracket to the frame, as shown in FIG 5.

In a similar manner, brackets 74, 76 and 78 are attached to each corner 50, 52 and 54, respectively; while these latter brackets do not serve to secure the folded corners together as might be the case in connection with bracket 62 on corner 56, they provide appliance and fixture mounting means as described below and also, rigidify the respective corner.

Each bracket 62, 74, 76 and 78 is provided with integral extensions and formations which serve a variety of functions for supporting fixtures and attachments on the frame 12. There is a first circular opening 80 formed in an extended part 82 of the leg 66. Opening 80 is provided for receiving the legs 20 of the bed 10. For purposes of preventing the legs from becoming detached inadvertently, a fastener, such as a set screw (not shown) may be provided through the part 82. More preferably, to avoid use of extraneous fasteners, a plug (not shown) may be permanently secured in the opening 80 to prevent the leg 20 disposed therein from leaving the opening.

A second circular opening 84 is provided in part 82, and this may be used to receive a standard 32 for holding a traction device 30, a plasma bottle 34, or a lamp 26, as shown in FIG. 1. A third opening 86 of generally square-shaped cross-sectional configuration is provided in part 82 for receipt of a headboard 16 or a footboard 18 positioned between two brackets. As in the case of a leg 24 disposed in an opening 80, locking or plug means may be provided in the opening 86 to prevent removal of the headboard of the footboard.

An additional formation 88 is provided on leg 64 for receipt of side rails or guards 17 or a bed table (not shown). Formation 88 includes a pair of extensions 90, 92 bent in an angular configuration to form an open channel into which the side rails or guards 17 may be positioned and secured therein.

Various modifications in arrangement and configuration of the openings 80, 84, 86 and 88 are possible; those illustrated and described are, for example, only of the many variations which may be provided within the scope of the invention. Further, it is to be understood that where a particular opening is described for purposes of receiving a particular attachment, another equally adaptable attachment may be retained in the opening instead of that which has been described.

Although not specifically illustrated, the bed frame 12 can be formed also from a pair of identical L-shaped rails arranged in an open boxlike frame. In this instance, there will be a pair of corners formed by adjacent free ends of the L-shaped rails at diametrically opposite corners of the frame. Also, the bed frame can be formed from four rail members suitably joined together into an open boxlike frame. The corners of the frame, in each instance, would accommodate a bracket, such as bracket 62 riveted to the adjacent side rail.

It will be appreciated that it may be possible to employ means other than rivets 68, 70 and complementary openings 72 for attaching a bracket to the bed frame.

I claim:

1. A bed frame of open rectangular configuration defined by four right angularly meeting rail sections providing four corners, said rail sections being formed of at least one rail member, a bracket member positioned around each corner, the two rail sections at each corner having right angularly orientated bracket receiving surfaces, each bracket including a pair of generally right angularly directed legs lying against the right angularly orientated bracket receiving surfaces of the rail sections forming the corresponding corner, fastener means securing each leg to the corresponding bracket receiving surface for a locking of the bracket to the corner forming rail sections, at least a first one of said bracket legs having an extension thereon projecting laterally outward from the adjoining rail section, said extension including fixture attachment means for receiving and vertically orientating at least one fixture generally perpendicular to the bed frame and immediately outward thereof.

2. A bed frame as described in claim 1, wherein the second of said bracket legs has extension means thereon projecting laterally outward from the adjoining rail section, said second bracket leg extension means including means for receiving and vertically orientating at least one fixture generally perpendicular to the bed frame and immediately outward thereof.

3. A bed frame as described in claim 2, wherein each bracket, including the right angularly directed legs, the extension on the first leg and the extension means on the second leg, is formed as an integral member.

4. A bed frame as described in claim 2, wherein the fixture attachment means associated with the extension on the first of said bracket legs includes a downwardly directed opening for receiving and mounting a vertical frame elevating and supporting leg laterally outward of the frame.

5. A bed frame as described in claim 4, wherein the fixture attachment means associated with the first bracket leg extension includes at least one additional fixture receiving opening defined vertically in said extension and laterally of the leg receiving opening.

6. A bed frame as described in claim 5, wherein the fixture attachment means associated with the first bracket leg extension includes a second additional fixture receiving opening defined vertically within the extension and laterally of the leg receiving opening and the first additional opening.

7. A bed frame as described in claim 6, wherein the extension means on the second bracket leg defines a vertically outwardly directed channel for reception and support of a bed side guard or the like.

8. A bed frame as described in claim 7, wherein said fastener means comprises rivets projecting from the rail facing surfaces of the legs of each bracket and cooperating rivet receiving openings in the aligned bracket receiving surfaces of the corresponding rail sections.

9. A bed frame as described in claim 8, wherein the angle between the legs of each bracket is initially greater than ninety degrees prior to securement thereof on the rail sections, said legs being bent to close the angle and conform to the corner upon securement.

10. A bed frame as described in claim 9, wherein said bracket, including the right angularly directed legs thereof, the extension on the first of said legs and the extension means on the second of said legs, constitutes a single integrally formed member.

11. A bed frame as described in claim 1, wherein the fixture attachment means includes a downwardly directed opening for receiving and mounting a vertical frame elevating and supporting leg laterally outward of the frame, and at least one additional fixture receiving opening defined vertically in the extension laterally of the leg receiving opening.

12. A bed frame as described in claim 2, wherein the extension means on said second bracket leg defines a vertical outwardly directed channel for reception and support of a bed side guard or the like.

* * * * *